United States Patent [19]

Stevens

[11] 3,826,987

[45] July 30, 1974

[54] MINIATURE RADIO RECEIVER

[76] Inventor: Jack D. Stevens, 125 Willow Dr., Danville, Calif. 94526

[22] Filed: May 30, 1973

[21] Appl. No.: 365,313

[52] U.S. Cl. ............................ 325/361, 179/107 H
[51] Int. Cl. ............................................ H04b 1/08
[58] Field of Search ........ 179/107 E, 107 H, 156 R, 179/182 R; 325/111, 356, 361

[56] References Cited

UNITED STATES PATENTS

| | | | |
|---|---|---|---|
| 3,209,080 | 9/1965 | Guttner ct al. | 174/107 H |
| 3,688,052 | 8/1972 | Self et al. | 179/107 H |
| 3,720,874 | 3/1973 | Gorcik | 325/111 |

*Primary Examiner*—Albert J. Mayer
*Attorney, Agent, or Firm*—Townsend and Townsend

[57] ABSTRACT

A miniature radio receiver adapted to be worn over the ear of the user. The electrical components of the radio receiver are housed in a casing comprising two complementary casing portions. An antenna has an externally threaded adjustment element protruding rearwardly of the housing. Each casing portion is provided with a mating internally threaded half-nut which cooperates with the adjustment element external threads to enable manual station selection. The radio receiver is powered by a hearing aid battery mounted in a pivotable holder at the rear of the casing.

8 Claims, 7 Drawing Figures

MINIATURE RADIO RECEIVER

BACKGROUND OF THE INVENTION

This invention relates to the field of miniature radio receivers.

Many radio receivers are known which are adapted to be carried by a user. Until now, however, such radio receivers, although small in size, have been somewhat cumbersome to carry. Also, the operation of such ratio receivers in a public environment, such as on public transportation vehicles or in an office, frequently constitutes an annoyance to nearby persons. To allieviate this problem, some radio receivers are provided with an ear phone attachment which enables the user to listen to programs in privacy without disturbing nearby persons. However, such receivers require a long lead connection which must be run from the location of the radio, usually a shirt pocket of the user, to the earphone located in the user's ear. The use of such a long lead connection is disadvantageous in that it is generally unsightly, causes a power loss, and is at best tedious to arrange.

SUMMARY OF THE INVENTION

This invention described herein comprises a miniature radio receiver which is extremely light in weight and durable, which affords private listening without annoying members of the public and which eliminates the long connecting leads heretofore required in known devices. The miniature radio receiver is housed in a casing having a shape conformable to the ear of the user so that the device may be mounted directly over the ear of the user. The electrical components are mounted on a small circuit board interior of the housing. The housing comprises a pair of complementary casing portions each having a molded internal half-nut integral thereto in the rear of the casing interior. An antenna is provided with a tuning element having external threads which mate with the female half-nuts to enable manual tuning of the radio receiver. The radio receiver is powered by a standard miniature hearing aid battery mounted in a pivotable holder having an enlarged nose portion providing a positive detent latch in a notch formed in the rear of each casing portion. The sound output is provided alternatively by a standard high impedance hearing aid earphone, or a hearing aid speaker and sound tube terminating in an ear plug.

For a further understanding of the nature and advantages of the invention, reference should be had to the following description taken in conjunction with the accompanying drawings.

DESCRIPTION OF THE PREFERRED EMBODIMENT

Figures 1, 2:
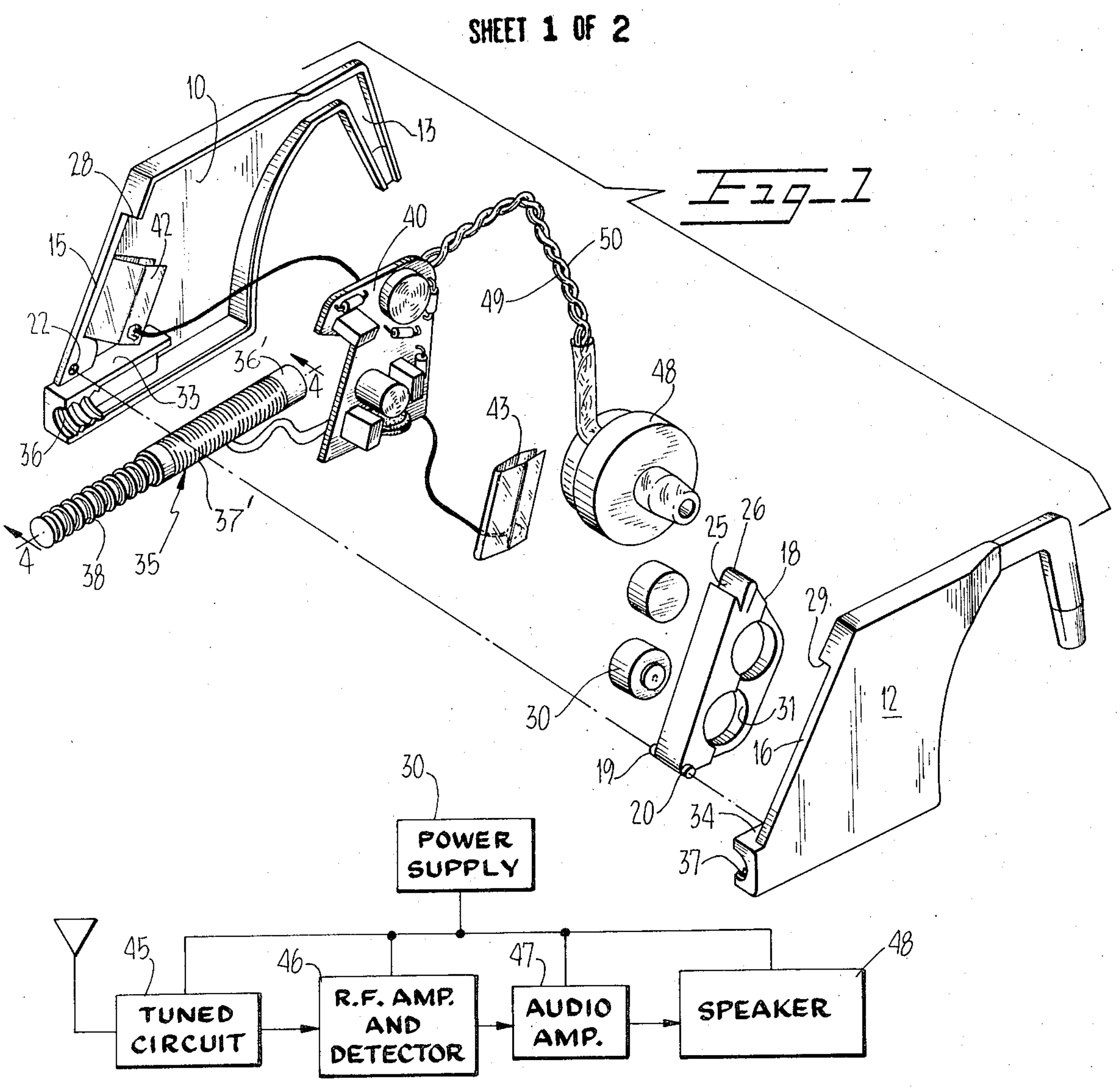
FIG. 1 is an exploded perspective view of the preferred embodiment of the invention.
FIG. 2 is a block diagram of the radio receiver.

Turning now to the drawings, FIG. 1 is an exploded perspective view showing the preferred embodiment of the invention. A pair of casing elements 10, 12 enclose the several components described below which together comprise a radio receiver. Casing portions 10, 12 are provided with complementary outlet channels 13, 14 interior thereof, the latter being visible in FIG. 5, for a purpose to be described.

Casing portions 10, 12 are also provided with complementary notched rear edges 15, 16 to accomodate a pivotable battery holder 18. Battery holder 18 is provided with a pair of oppositely extending pin portions 19, 20 which are received in apertures 22, 23 located in the interior wall of casing portions 10, 12, aperture 23 being visible in FIG. 5. Battery holder 18 has a notched free end 25 providing a proturuding lip 26 which extends a sufficient distance to provide positive detent in cooperation with the upper edges 28, 29 of notched walls 15, 16 serving to hold battery holder 18 in the closed postion. A standard 1.5 volt DC hearing aid battery 30 is received in a mounting aperture 31 of battery holder 18 to furnish electrical power for the radio receiver. Casing portions 10, 12 and battery holder 18 may be constructed in any suitable manner known to those skilled in the art, preferably by molding from a suitable plastic such as ABS polymer.

Casing portions 10, 12 are each provided with an inner wall portion 33, 34 extending generally parallel to the lower edge thereof which provides a recess for accomodating an adjustable antenna 35. Wall portions 33, 34 each terminate in a female threaded half-nut portion 36, 37 which, when mated, form a stationary nut for enabling adjustment of antenna element 35 in the manner described below.

Figures 4, 5:
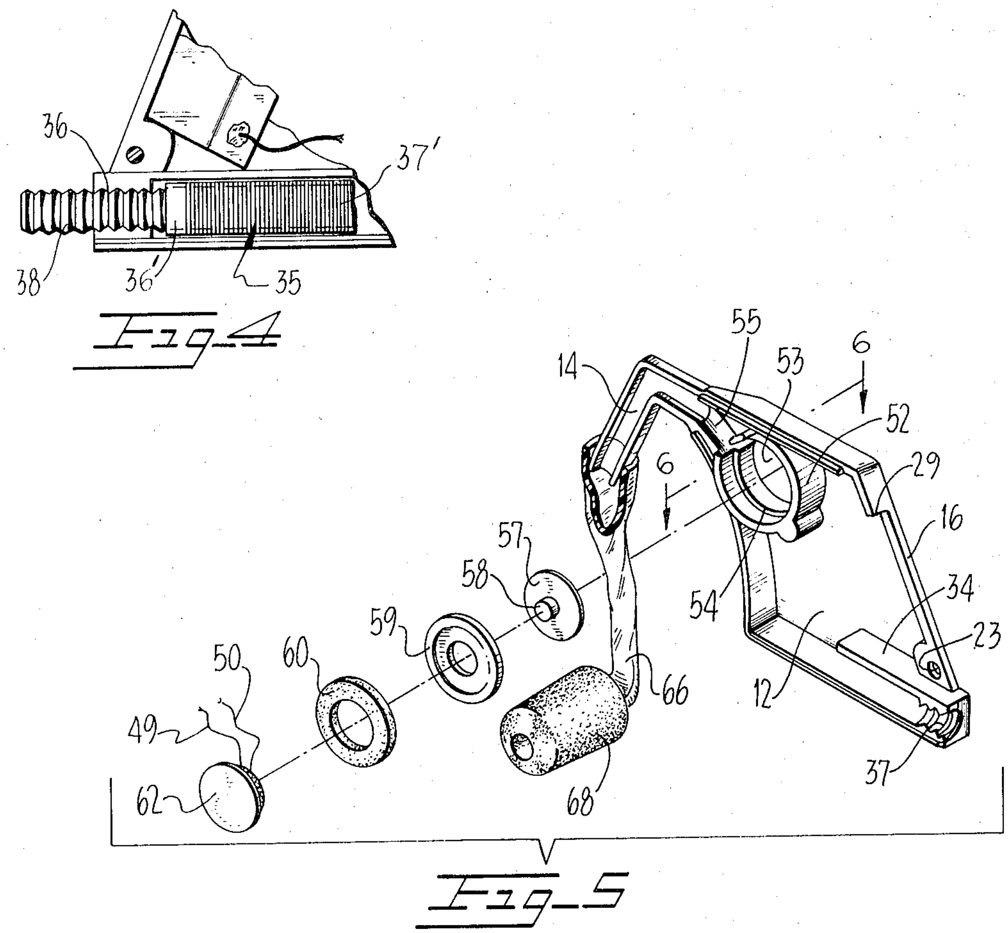
FIG. 4 is a partial sectional view taken along lines 4—4 of FIG. 1.
FIG. 5 is an exploded perspective view showing an alternate embodiment of the speaker.

With reference to FIGS. 1 and 4 antenna element 35 comprises a hollow bobbin 36' constructed from an electrically insulating material, such as nylon, and having a multi-turn coil 37' wound about the periphery thereof, and an externally threaded adjustable tuning element 38. Coil 37' preferably comprises approximately 220 turns of number 47 wire. Adjustable tuning element 38 is preferably fabricated from a pure ferrite cylindrical slug having an outer diameter slightly smaller than the inner diameter of bobbin 36' so that element 38 may be advanced and retracted within bobbin 36'. The threads on adjustable tuning element 38 are sized in complementary fashion to the female threads of nut portions 36', 37' of casing portions 10, 12. Antenna element 35 is secured to casing portions 10, 12 by means of a suitable adhesive compound.

Figure 3:
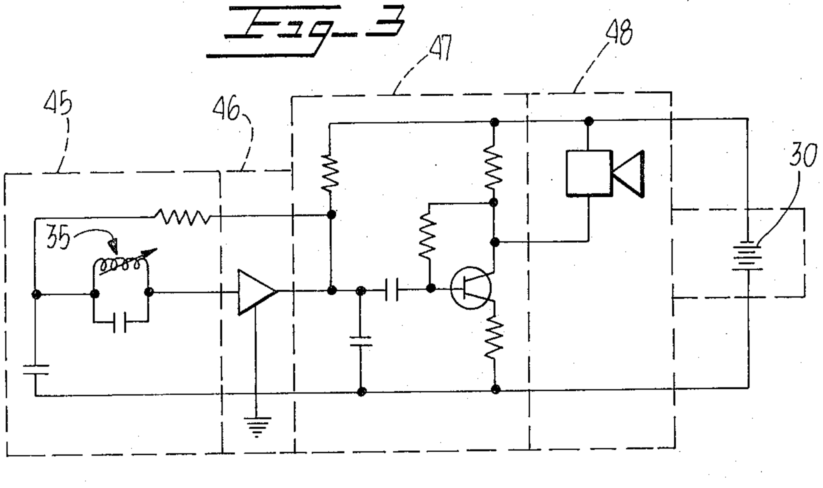
FIG. 3 is a circuit diagram showing in detail the individual elements of the FIG. 2 diagram.

The electrical components of the invention shown in FIG. 3 are mounted on a miniature circuit board 40 positioned in the hollow interior region provided by casing portions 10, 12. Power is supplied to the electrical portion of the invention from battery 30 by a pair of contacts 42, 43 which are secured to the inner wall of casing portions 10, 12 respectively, adjacent notched walls 15, 16. Contacts 42, 43 are preferably fabricated from phosphor bronze and may be secured to casing portions 10, 12 by means of a suitable adhesive compound.

With reference to FIGS. 2 and 3, the electronic portion of the invention comprises a standard AM radio circuit comprising power supply 30, a tuned circuit 45, an RF amplifier and detector 46, an audio amplifier 47 and a speaker 48. Tuned circuit 45 includes antenna element 35. RF amplifier and detector 46 preferably comprises a type ZN 414 RF amplifier and detector manufactured by Ferranti Electric, Ltd., of Oldham, Manchester, England. Audio amplifier 47 comprises a standard transistorized audio amplfier. In the embodiment shown in FIG. 1, speaker 48 comprises a standard high impedance crystal earphone of the type customarily employed in hearing aids. Earphone 48 is connected to the output of audio amplifier 47 by a pair of leads 49, 50 which are received in channels 13, 14 of casing portions 10, 12.

As best shown in FIGS. 1 and 4, the radio may be adjusted by the user to stations of different frequencies by rotating tuning element 38. When tuning element 38 is rotated in a first direction, it is advanced into the interior of coil bobbin 36' by means of the threaded engagement with nut portions 36, 37. Rotation of tuning element 38 in the opposite direction causes this element to retreat from the interior of coil bobbin 36.

Figure 6:
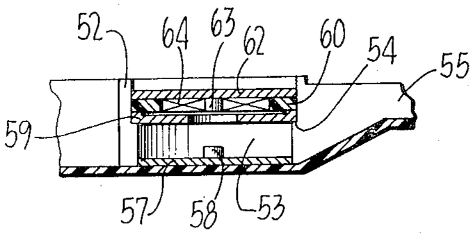
FIG. 6 is a sectional view taken along lines 6—6 of FIG. 5.

FIGS. 5 and 6 illustrate an alternate embodiment of speaker 48. An inwardly extending wall 52 of casing portion 12 forms a chamber 53 having an annular ledge 54 and a sound outlet channel 55 in communication with channel 14. A round disk 57, preferably constructed of spring steel, and having a centrally located substantially cylindrical pole portion 58 fabricated from magnetic material such as soft iron is received in the bottom of chamber 53 with pole portion 58 extending generally upwardly as viewed in FIG. 6. An apertured disk 59 is mounted in chamber 53 with the lower edges thereof in contact with shoulder 54. A second apertured disk 60 fabricated from a magnetic material such as magnetized rubber rests on the upper surface of disk 59. An electro-magnetic element 62 having a pole portion 63 constructed of a suitable magnetic material such as soft iron and a coil 64 wound about pole portion 63 is mounted on disk 60, the lower surface of coil 64 lying above the upper surface of disk 59. Coil 64 is electrically connected by means of leads 49, 50 to the output of audio amplifier 47. The sound waves produced by the elements described immediately above are coupled via channels 13, 14, tubular sleeve 66, preferably constructed of plastic materials, and a plug 68 to the ear of the user.

Figure 7:
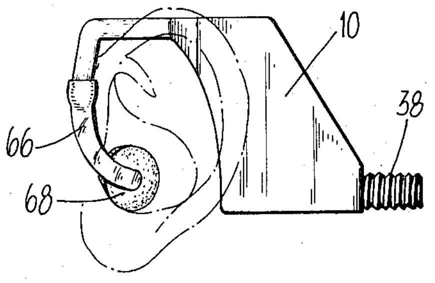
FIG. 7 is an elevational view showing the manner in which the invention is worn.

FIG. 7 illustrates the manner in which the invention is worn by the user. As shown in this FIG., the assembled radio is placed over the ear of the user with plug 68 (or earphone 48) inserted in the opening of the auditory canal. Tuning element 38 is then manually adjusted unti the radio receiver is tuned to the desired station. After station selection, the device may be casually worn due to the extremely light weight of the components and the counterbalancing afforded by the casing configuration and the ear plug or earphone.

As will now be apparent, the invention provides an extremely light weight radio receiver which is rugged in construction and readily carried by the user. Miniature radio receivers constructed according to the invention may be operated in any public environment without fear of annoyance to nearby persons. It is further noted that miniature radio receivers constructed according to the invention have been found to provide reception which is virtually omnidirectional.

While the above provides a full and complete disclosure of the preferred embodiment of the invention, various modifications, alternate constructions and equivalents may be employed without departing from the true spirit and scope of the invention. Therefore, the above description and illustrations should not be construed as limiting the scope of the invention which is defined by the appended claims.

What is claimed is:

1. A tuneable miniature radio receiver adapted to be worn on the ear of a user, said radio receiver comprising:

a housing including first and second complementarily configured casing portions having an exterior configuration adapted to be accommodated over and partially behind the ear of the user, said casing portions each having a stationary female half-nut adjacent an end thereof, said female half nuts forming a full nut when said casing portions are assembled, said casing portions further having forwardly and downwardly extending complementary hook-like projections forming an outlet channel interior thereof when said casing portions are assembled;

a circuit board mounted interior of said housing, said circuitboard carrying a plurality of components comprising a radio receiver;

means for coupling electrical energy to said radio components; and a tuneable antenna for enabling manual selection of different radio stations over a band of such stations, said antenna comprising a stationary tuneable element mounted interior of said housing and a rotatable and translatable tuning adjustment element having external screw threads in engagement with said full nut, whereby rotation of said adjustment element in a first direction causes said elemnt to advance into said housing and rotation of said adjustment element in the opposite direction causes said element to retreat from said housing.

2. The apparatus of claim 1 wherein said stationary female half-nuts are located along the bottom portion of said housing and at the rear thereof.

3. The apparatus of claim 1 wherein said means for coupling electrical energy includes a battery holder mounted in said housing and adapted to receive a battery, and a pair of contacts secured interior of said housing.

4. The apparatus of claim 3 wherein said first and second casing portions have complementarily configured rear wall surfaces providing an opening sized to accomodate said battery holder and a pair of facing pivot bearings, and said battery holder is provided with a pair of oppositely extending pivot pins received in said pivot bearings and a protruding opposite end portion engageable with a portion of said rear wall surfaces to provide a positive detent serving to retain said battery holder in a fixed position.

5. The apparatus of claim 1 further including an earphone mounted exterior of said housing and means for coupling said earphone to said radio receiver, said coupling means being partially located in said outlet channel.

6. The apparatus of claim 1 wherein said first casing portion has a walled chamber on the interior side thereof, said chamber having an open wall portion serving to communicate said chamber to said outlet channel, a miniature speaker mounted in said chamber and coupled to said radio receiver, an ear plug adapted to be inserted into the auditory canal of a user, and a hollow sleeve coupled to the free end of said hook-like projection and to said plug.

7. The apparatus of claim 1 wherein said antenna stationary element comprises a hollow bobbin and a coil wound about said bobbin, and wherein said antenna adjustment element comprises a core element partially received within the interior of said bobbin, the outer diameter of the lands of said screw threads of said adjustment element being smaller than the inner diameter of sad hollow bobbin.

8. The apparatus of claim 7 wherein said adjustment element is constructed of ferrite.

* * * * *